(12) United States Patent
Grossman

(10) Patent No.: US 7,446,783 B2
(45) Date of Patent: Nov. 4, 2008

(54) SYSTEM AND METHOD FOR MANIPULATING AN IMAGE ON A SCREEN

(75) Inventor: Peter Alexander Grossman, Murrumbeena (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 1086 days.

(21) Appl. No.: 09/834,255

(22) Filed: Apr. 12, 2001

(65) Prior Publication Data

US 2002/0149605 A1 Oct. 17, 2002

(51) Int. Cl.
*G09G 5/34* (2006.01)
*G09G 5/36* (2006.01)

(52) U.S. Cl. .................. 345/660; 345/157; 345/173; 345/179; 345/419

(58) Field of Classification Search .......... 345/660, 345/661, 472, 472.1, 472.2, 815, 619, 157, 345/173, 179, 419; 348/576
See application file for complete search history.

(56) References Cited

U.S. PATENT DOCUMENTS

| | | | | |
|---|---|---|---|---|
| 4,899,292 A | * | 2/1990 | Montagna et al. | 707/104.1 |
| 5,326,270 A | * | 7/1994 | Ostby et al. | 434/362 |
| 5,374,995 A | * | 12/1994 | Loveridge et al. | 358/447 |
| 5,542,038 A | * | 7/1996 | Schafer | 345/671 |
| 5,544,358 A | * | 8/1996 | Capps et al. | 715/523 |
| 5,581,052 A | * | 12/1996 | Padula et al. | 178/19.04 |
| 5,588,139 A | * | 12/1996 | Lanier et al. | 703/1 |
| 5,602,870 A | * | 2/1997 | Hailey et al. | 375/230 |
| 5,945,981 A | * | 8/1999 | Paull et al. | 345/180 |
| 6,052,110 A | * | 4/2000 | Sciammarella et al. | 345/661 |
| 6,067,070 A | * | 5/2000 | Suzuki et al. | 345/660 |
| 6,188,432 B1 | * | 2/2001 | Ejima | 348/240.99 |
| 6,321,158 B1 | * | 11/2001 | DeLorme et al. | 701/201 |
| 6,570,583 B1 | * | 5/2003 | Kung et al. | 345/661 |
| 6,711,283 B1 | * | 3/2004 | Soenksen | 382/133 |
| 6,750,903 B1 | * | 6/2004 | Miyatake et al. | 348/218.1 |
| 2002/0092029 A1 | * | 7/2002 | Smith | 725/105 |
| 2002/0112237 A1 | * | 8/2002 | Kelts | 725/39 |
| 2002/0180763 A1 | * | 12/2002 | Kung | 345/660 |

* cited by examiner

*Primary Examiner*—Kee M. Tung
*Assistant Examiner*—J. Amini

(57) ABSTRACT

A system and method for zooming into or out of an image on a screen, in which the image is displayed on a touch screen, and a user zooms into a portion of the image by placing a stylus at a desired image point on the screen. The system repeatedly enlarges the image about the image point indicated by the stylus until the user moves the stylus off of the screen, so that whilst the stylus is on the screen, the user sees a continuous enlargement about the point of the stylus. If the stylus is dragged across the screen during the zoom, then the center of the zoom changes to follow the stylus. A zoom-out action may occur in a similar manner to the zoom-in action.

10 Claims, 7 Drawing Sheets

| Table 1 ||
|---|---|
| Relation | Formula |
| Linear | $y = m(x-h) + k$ |
| Quadratic | $y = a(x-h)^2 + k$ |
| Circle | $(x - h)^2 + (y - k)^2 = r^2$ |
| Ellipse | $(x - h)^2/a^2 + (y - k)^2/b^2 = 1$ |
| Hyperbola1 | $(x - h)^2/a^2 - (y - k)^2/b^2 = 1$ |
| Hyperbola2 | $(y - k)^2/b^2 - (x - h)^2/a^2 = 1$ |
| Parabola1 | $y = a(x - h)^2 + k$ |
| Parabola2 | $(y - k)^2 = c(x - h)$ |
| Exponential1 | $y = b \cdot a^x + k$ |
| Exponential2 | $y = b \cdot e^{ax} + k$ |
| Logarithmic | $y = b \cdot \ln(a(x - h)) + k$ |
| Power | $y = a(x - h)^r + k$ |
| Sine | $y = b \cdot \sin(a(x - h)) + k$ |
| Cosine | $y = b \cdot \cos(a(x - h)) + k$ |

*Figure 2*

SYSTEM AND METHOD FOR MANIPULATING AN IMAGE ON A SCREEN

FIELD OF INVENTION

The present invention relates to a system and method for the manipulation of images on a screen, and particularly relates to a system and method for use with a touch-sensitive screen.

BACKGROUND OF INVENTION

In devices that allow a user to view an image on a screen, such as a picture or a diagram, a function is often provided which allows the user to zoom into or out of a particular portion of the image. In a typical example of such a zoom, a user must first draw a rectangular "zoom box" or "marquee" on the region of the screen where the zoom is required. The device then refreshes the image on the screen, with the region that was enclosed within the box magnified to occupy the whole of the screen.

If the user finds that further magnification is required, then the process may be repeated. Thus, a box is drawn about a new region of the screen, and the screen is refreshed so that the new box occupies the full screen.

There can be problems with such systems, in that in order to obtain a desired zoom, the user may need to repeat the above steps a number of times. Furthermore, it can be difficult to draw the box accurately enough to ensure that the center of the zoom is at a desired point. This may be particularly problematic if a number of magnifications is needed, as any error in the position of the actual zoom center as compared to the desired zoom center may be magnified on each step. Thus, the user may be required to repeat the whole magnification process should the final image not adequately show the actual area of interest.

The object of the present invention is to provide an improved system and method for zooming into and out of a feature of an image on a screen.

SUMMARY OF INVENTION

According to a first aspect of the present invention, there is provided an image manipulation system which includes a touch-sensitive screen and a stylus for indicating to a point on the screen by touching the screen, the system allowing a user to carry out a zoom action on an image on the screen by detecting a point indicated by the stylus on the screen, and by repeatedly performing a zoom action on the image using the detected point as the center of the zoom action until the stylus is removed from the screen.

The zoom action may comprise an enlargement of the image on the screen about the zoom center and/or a reduction of the image on the screen about the zoom center.

The present invention provides a system of zooming into or out of an image on a screen which is simple to use and control. It allows the user to accurately locate the center of the zoom, and to control the amount of zoom. Thus, the user can select the zoom center accurately with the stylus, can view the zoom action as it occurs on the screen, and can stop the zoom at any suitable point (the amount of zoom being defined by the amount of time that the stylus is retained on the screen).

Typically, the screen image will be refreshed a number of times per second, each time being magnified or reduced by a uniform amount, and the user's view may be as if "flying into" the image. Preferably, the position of the stylus on the screen is continually monitored, and, on movement of the stylus across the screen, the center of the zoom action is altered so that the center of the zoom action follows points on the screen traced by the stylus.

This feature allows the user to adjust the center of the zoom, and allows for more control of the zoom. This can be especially useful during the continuous zoom of the present invention, since, during the zoom action, as more detail or more regions of the image come into view on the screen, the user may become aware of a point of interest away from the zoom center that was originally chosen.

It should be noted that it is the center of the zoom which follows the points traced by the stylus, and that, during the zoom, the movement of the stylus does not produce a "panning" effect (Panning is where the portion of an image that can be seen on a screen is merely moved without a change in its size).

The present invention may be used in the display of for example pictures, photographs, drawings, diagrams and the like, but it is particularly preferred that the image to be displayed is the graphical form of a mathematical object, and that the image manipulation system is able to generate a graphical form of a mathematical object.

The present invention may also center the image on the screen so that the point at which the zoom is centered is mapped towards (and preferably to) the center of the screen.

This feature can be useful where the point of the image about which the zoom occurs is distant from the center of the screen, in which case, as the image is enlarged, image information adjacent to the zoom center may move off of the screen. The centering means may therefore move the image so that it is more central to the screen. This may occur automatically or on request, after a zoom action has finished (i.e. after the stylus has been removed from the screen), by e.g. mapping the image point at the center of the zoom towards the center of the screen. Alternatively, for example, during a zoom action, the dragging of the stylus may produce a panning effect, instead of changing the zoom center, so that the center of the zoom can be dragged towards the center of the screen whilst zooming continues (The change in the function of the stylus drag could for example be made through the toggling of a key).

The invention also extends to a method of manipulating an image on a screen, and, viewed from a second aspect, the present invention provides a method of manipulating an image on a touch-sensitive screen using a stylus, including the steps of displaying the image on the screen; detecting an instruction to perform a zoom action on the image; detecting a point of contact of the stylus on the screen; setting a center for the zoom action at the detected point of contact of the stylus on the screen; performing the zoom action on the image on the screen using the set center of zoom; and repeating the step of performing the zoom action until it is detected that the stylus has been removed from contact with the screen. The zoom action may be an enlargement or a reduction of the image on the screen about the zoom center.

Although the present invention is particularly applicable to a touch-screen and stylus device, and to their use in the manipulation of the graphical form of a mathematical object, the invention may also be applied in other manners. For example, instead of using a touch-screen and stylus, a digitising tablet and pen or puck or other suitable pointing device could be used. Also, the image might comprise a picture, photograph, drawing or the like, and may for example comprise a map.

Thus, viewed from a further aspect, the present invention provides a dataprocessing system for manipulating an image, which includes a display for displaying an image and an indicating device for indicating to a point on the display, the system generating an image on the display and providing a zoom action on the image on the screen; wherein, when a zoom action is activated, the system determines when the indicating device is indicating to a point on the screen, sets the indicated point as a zoom center, and repeatedly carries out a zoom action on the image on the screen about the zoom center until it detects that the indicating device has stopped indicating to the point.

Viewed from a further aspect, the present invention provides a data-processing method for the manipulation of an image on a screen, the method displaying the image on the screen; detecting an instruction to perform a zoom action on the image; detecting a point on the screen indicated to by an indicating device; setting a center of the zoom action at the indicated point; conducting the zoom action on the image on the screen about the set center of zoom; and repeating the zoom action until it is detected that the indicating device no longer indicates to the point.

BRIEF DESCRIPTION OF DRAWINGS

The invention will hereinafter be described in greater detail by reference to the attached drawings which show example forms of the invention. It is to be understood that the particularity of the drawings does not supersede the generality of the preceding description of the invention.

FIG. 2 is a table of relations for which the zoom function is available in the device of FIG.1;

DETAILED DESCRIPTION

Figure 1:
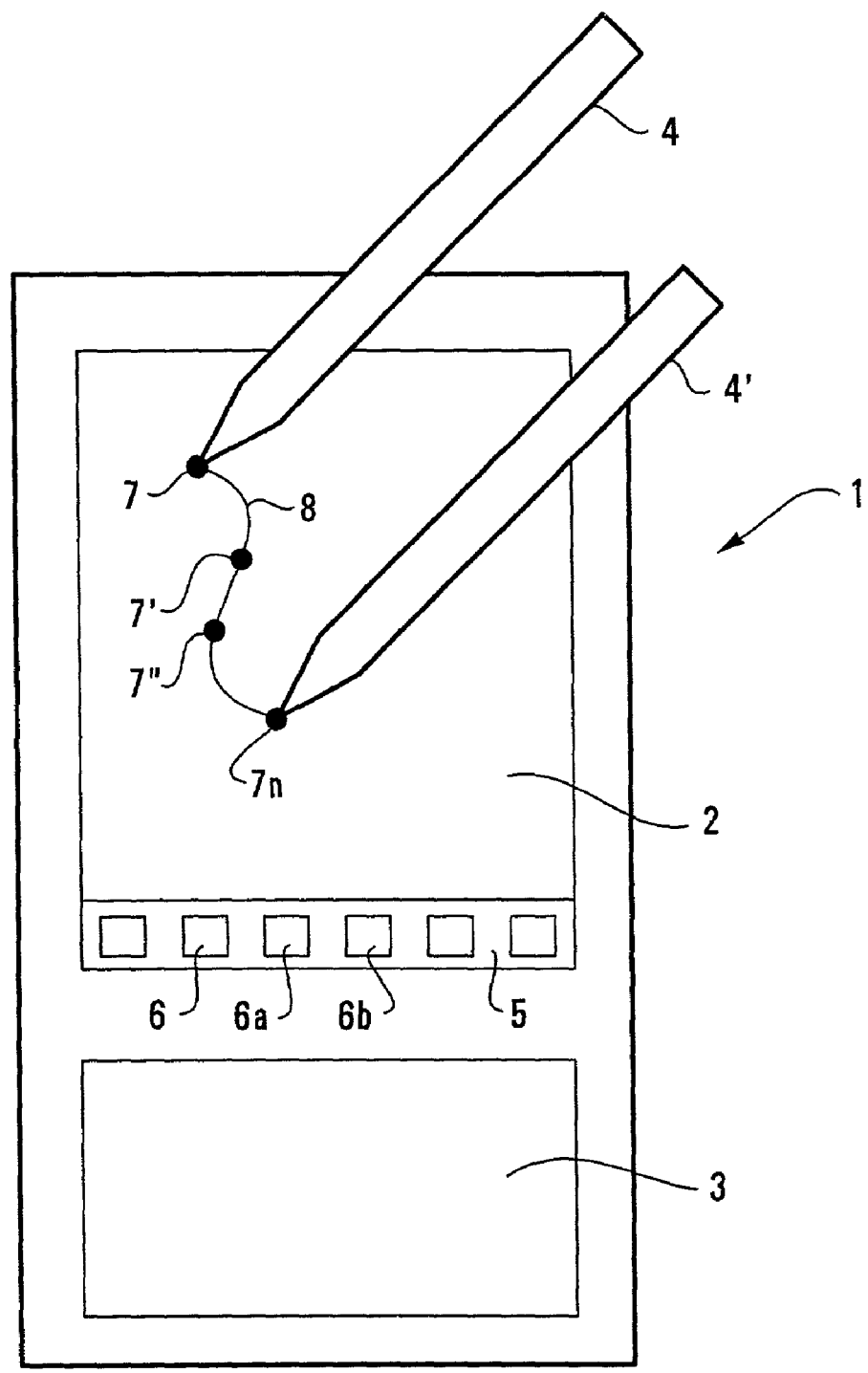
FIG. 1 is a schematic drawing of a device according to one embodiment of the present invention

FIG. 1 shows a graphics device 1 having a touch-sensitive screen 2, a key pad 3, and a stylus 4 (shown in two positions, 4 and 4').

The graphics device 1 can manipulate a mathematical object, e.g. a function or relation having a symbolic formula, and can generate a graphical form of the function or relation.

The device 1 displays the graphical form of the mathematical object to be manipulated in a graphing window on the screen 2, and also provides a menu of features on a toolbar 5 for manipulating the graphical form. A desired feature may be initiated by pointing to an associated icon 6 on the toolbar 5 with the stylus 4.

The touch screen 2 may take any suitable form, and may for example comprise a resistive, capacitive, surface acoustic wave or infrared screen, as are known in the art. The stylus may take a form appropriate for the type of touch-screen used. A resistive touch screen generally consists of electrically conductive and resistive layers separated by invisible separator dots, which, when pressed together cause a change in current to register a touch event. A capacitive touch screen has a capacitive material coating a glass surface, and oscillator circuits at its corners which vary in frequency according to where a stylus is placed on the screen (the stylus 4 should be wired to the device 1 to provide a charge at the stylus tip). A surface acoustic wave screen sends acoustic waves across a glass panel with a series of transducers and reflectors, and a soft-tipped stylus is used to absorb the waves at the point where it touches the screen to register a touch event. An infrared screen includes an invisible lattice of infrared light beams, and detects for breaks in the beams by the stylus.

In each case, the operating system of the device 1 can detect a stylus event and can provide the co-ordinates of the point on the screen to which the stylus 4 points.

Returning to the toolbar 5, two of the icons, 6a and 6b respectively, provide a dynamic zoom into the graphical form and a dynamic zoom out of the graphical form.

In order to effect a zoom into the graphical form, the user first selects icon 6a with the stylus 4, and then places the stylus 4 on the screen 2 at the point 7 at which the user desires the center of the zoom to be.

The operating system of the device notes a stylus event, and computer software in the device 1 which implements the present invention, continuously enlarges the image of the graphical form on the screen about the point 7 until the user removes the tip of the stylus 4 from the screen 2.

If the user drags the stylus 4 over the screen 2, then the center of zoom also changes to follow the stylus 4. Thus, if the tip of the stylus 4 is dragged across the screen 2 along a path 8 to the stylus position 4', the center of the zoom will change to follow the path, and will for example include intermediate zoom centers 7',7" before reaching a final zoom center 7n at the point where the stylus 4 comes to rest (n being the number of repeated enlargements which occur during the movement of the stylus between the positions 4 and 4', which will depend on the rate of repetition of the enlargements and the time taken to move the stylus 4 over the path 8).

It should be noted that the device 1 continues to zoom into the image on the screen 2 during the changes in the location of the zoom center 7.

The device 1 thus allows a user to zoom into a graphical form on the screen 2 in a continuous manner using the stylus 4, so that the user can simply and easily control the amount of zoom through the amount of time that the stylus 4 is held in contact with the screen 2. Further, the user is easily able to control the center of the zoom during zooming so as to remain in the area of interest. This latter feature is particularly advantageous in that the area of interest to the user may change during the zoom as for example more of the detail of the graphical form is revealed.

As well as zooming into the graphical form, the user may zoom out of the graphical form by selecting icon 6b, and by then placing the stylus 4 on the screen 2 at the desired center of the zoom-out until the desired amount of zoom-out has been achieved at which point the user removes the stylus 4 from the screen 2.

Generally, a number of other manipulations are also possible besides zooming, and these may include: "panning" of the co-ordinate plane (i.e. changing the rectangular portion of the infinite co-ordinate plane that is visible on the screen), and translating or dilating a function.

The zooming into and zooming out of the graphical form may be allowed for a specific collection of relations that are built into the device 1. Such relations may for example take the form of the table of relations shown in FIG. 2. Instead of choosing a relation from a pre-defined list, the device 1 may also allow a user to define the mathematical relation by inputting desired information into the device in order to construct a mathematical equation. In this case, the device 1 may include a software component for classifying the user-defined relation as conforming to one of a set of pre-defined relations built into the device.

The process of zooming into or out of a graphical form involves the recalculation of the portion of the Cartesian co-ordinate plane of the graphical form that will be visible on the screen (which will depend on the zoom factor and on the center of the zoom), and the recalculation of the values that the graphical form will take in this portion of the Cartesian plane.

Figure 3:
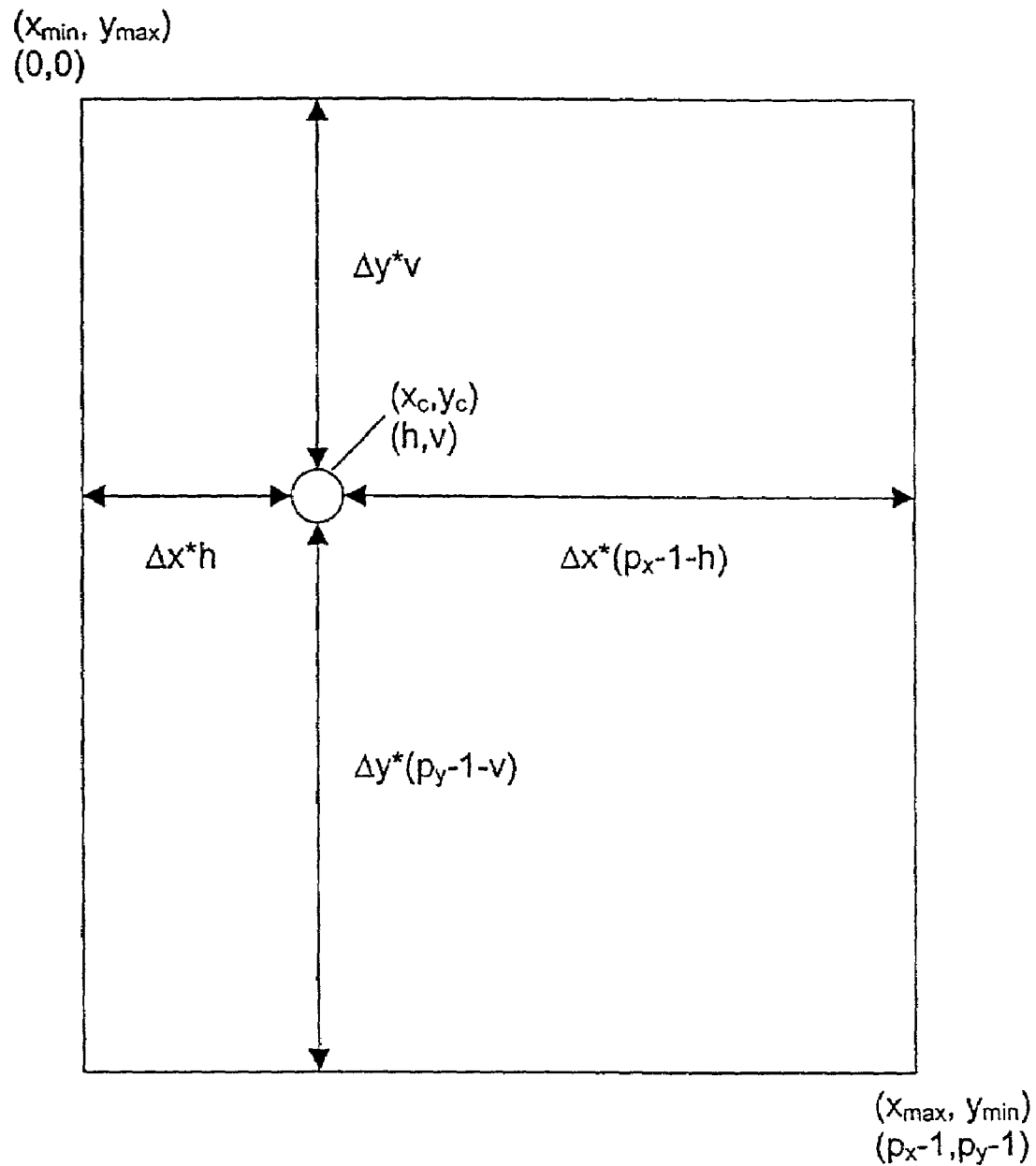
FIG. 3 is a view of a graphing window of the screen display showing its pixel and Cartesian co-ordinates.

Referring to FIG. 3, the graphing window of the screen 2 in which the graphical form will appear consists of a rectangular grid of pixels that measures $p_x$ pixels horizontally and $p_y$ pixels vertically, and has an upper left corner with pixel co-ordinates of (0,0), and a bottom right corner with pixel co-ordinates of ($p_x$–1, $p_y$–1). It also has Cartesian co-ordinate boundaries of ($x_{min}$, $y_{max}$) and ($x_{max}$, $y_{min}$).

When a zoom into the graphical form occurs, the scale of the Cartesian coordinates is increased in accordance with the zoom factor, so that a smaller region of the graphical form is seen on the screen in greater detail. Thus, if the distance between each row of pixels on the screen 2 before a zoom is Δy Cartesian units apart, and the distance between each column of pixels before a zoom is Δx Cartesian units apart, then, after a zoom into a graphical form by a factor of Z, the distance between the screen pixels, as measured by the rescaled Cartesian co-ordinate system, will be Δx/Z and Δy/Z (since the scale of the Cartesian co-ordinates will increase by a factor of Z).

As can be see from FIG. 3, a zoom into or out of the window by a factor of Z about a pixel point with pixel co-ordinates (h,v) and Cartesian co-ordinates ($x_c$,$y_c$) would provide new screen boundaries having Cartesian co-ordinates of:

$$x_{min} = x_c - \Delta x^* h, \; x_{max} = x_c + \Delta x^*(p_x - 1 - h)$$

$$y_{min} = y_c - \Delta y^*(p_y - 1 - v) \; y_{max} = y_c + \Delta y^* v \quad \text{(Eqn. 1)}$$

where Δx and Δy are the new distances between the pixels values, e.g. increased or decreased from their previous values by the zoom factor Z.

The zoom factor may be suitably small (close to 1) so that the user's perception of the zoom is that it is continuous.

Figure 4:
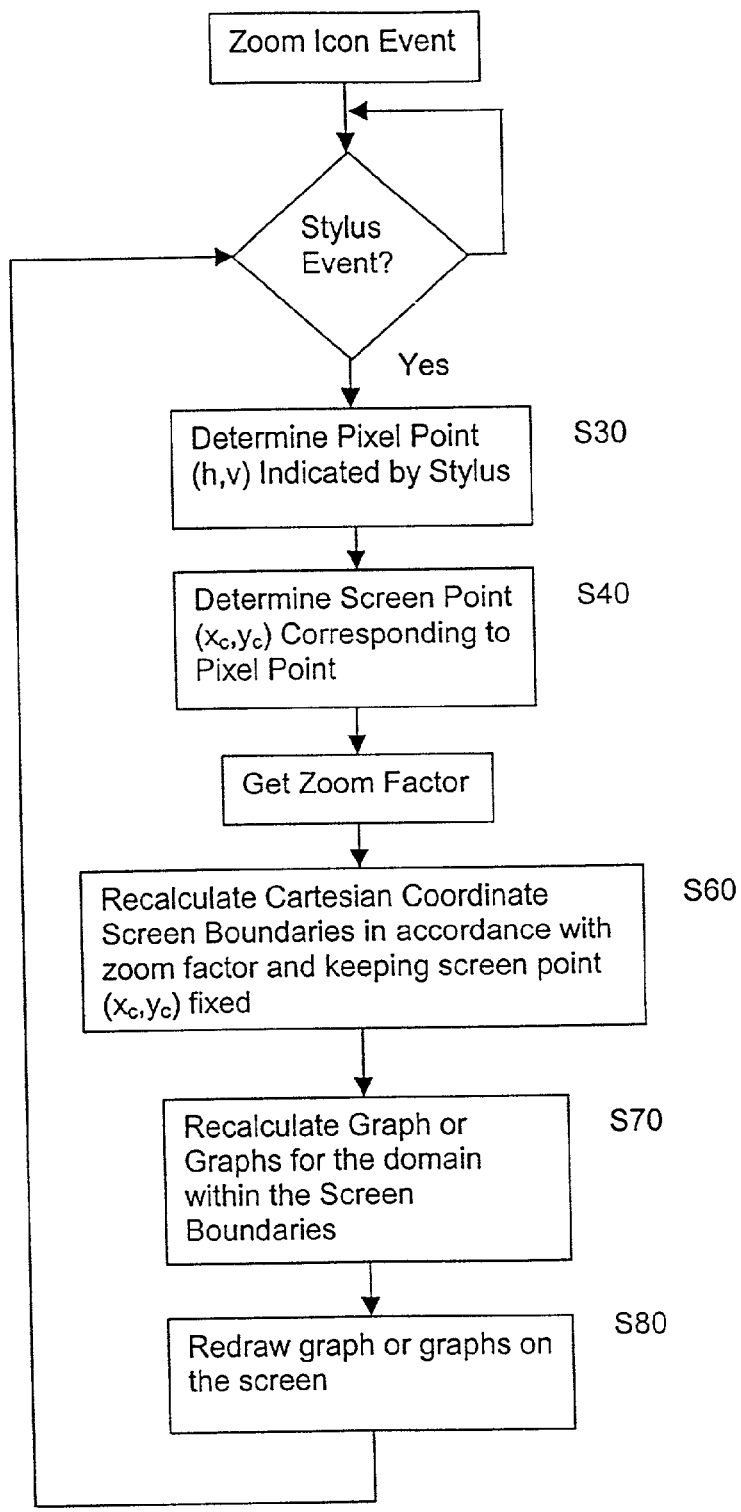
FIG. 4 is a flowchart for carrying out a zoom action on a graphical object on the screen.

FIG. 4 shows a flowchart for conducting a zoom into or out of a graphical form that is displayed on the screen 2 in accordance with the present invention which may be implemented by a software application running on the device 1. It will be understood that, in the light of the present teachings of the invention, a programmer may implement the flowchart of FIG. 3 as software in a variety of manners.

In step S10, the zoom process is called when a Zoom Icon event is noted (the selection of either icon 6a or 6b). The process then passes to step S20, in which a check is made for a stylus event on the screen. When such an event occurs, the process passes to step S30, where the pixel co-ordinates (h,v) of the point indicated by the stylus are determined from the stylus position on the touch screen given by the device's operating system. Next, in step S40, the process determines the point ($x_c$, $y_c$) in the Cartesian co-ordinate plane of the graphical form which corresponds to the pixel point (h, v), and, in step S50, obtains the zoom factor. The zoom factor will be stored in memory, and is preset, but, if desired, may be varied by the user prior to zooming.

The process then passes to step S60, in which the new Cartesian co-ordinate screen boundaries are calculated in accordance with Eqn. 1 above, and to step S70, where the graphical form is replotted for the domain of the new screen boundaries. The new graphical form plots are then displayed on the screen in step S80.

Steps S20-S80 are repeatedly performed until the user removes the stylus 4 from the screen 2. Also, as the stylus 4 moves across the screen 2, so does the center of the zoom. The routine of FIG. 3 may end when the user exits the zoom feature by for example selecting a different feature from the toolbar 5.

The replotting and drawing of the graphical form in steps S70 and S80 may involve the determination of a value for the underlying relation for each possible x-axis value of the Cartesian co-ordinates that may be displayed on the graphing window, or may involve the determination of values at only a few selected points, and then the drawing of the graphical form on the screen using an interpolation method or other line drawing technique. Such interpolation methods would be selected depending on the function to be drawn. Thus, each relation listed in the table of FIG. 2 may have an interpolation method associated with it. This method may be determined in accordance with the known mathematical properties of the relation, as would be understood by a person skilled in the art.

If more than one graphical form is displayed on the screen, then the calculations are carried out for all of the graphical forms, and all of the graphical forms are re-displayed.

As well as the zoom action, the device 1 may allow the re-centering of the image on the graphing window of the screen 2, so that for example after the zoom action has finishes, the center of the zoom action may be mapped to the center of the graphing window.

Figure 5:
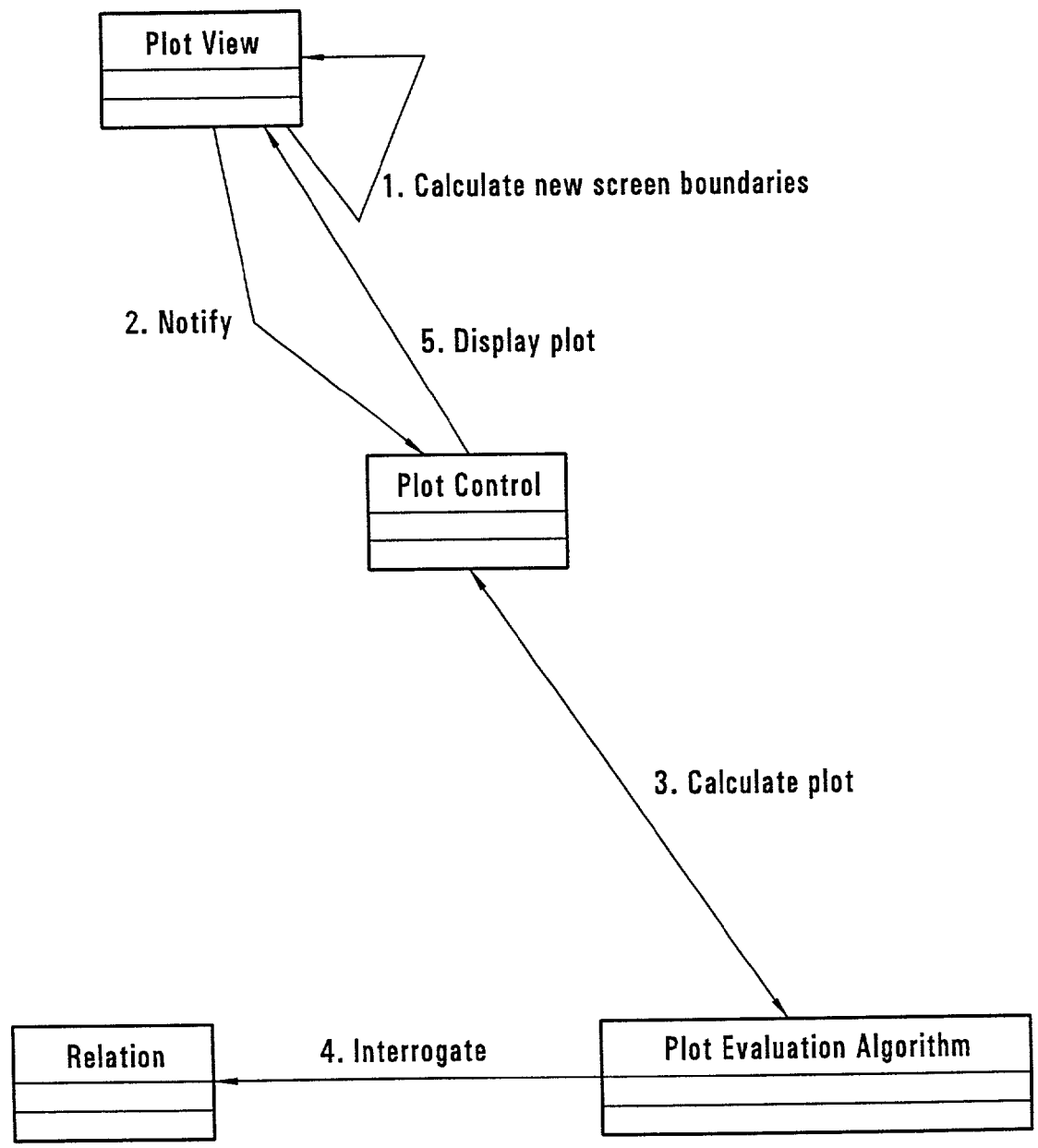
FIG. 5 is a graphical view of the interactions underlying a software architecture that may support the zoom features of the present invention.
Figure 8:
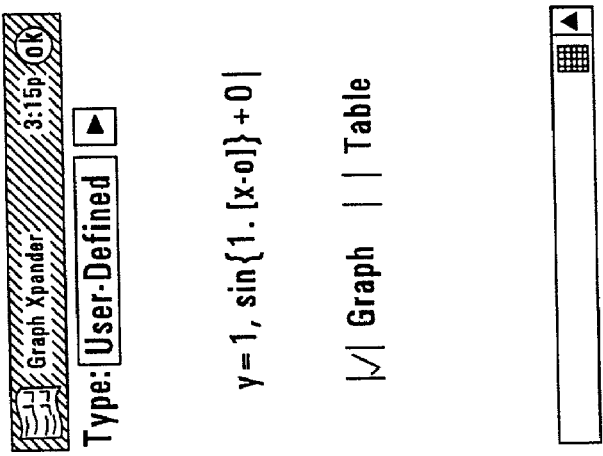
FIGS. 6-12 show an example of possible screen displays of the device of FIG. 1 during a zoom procedure.
Figure 7:
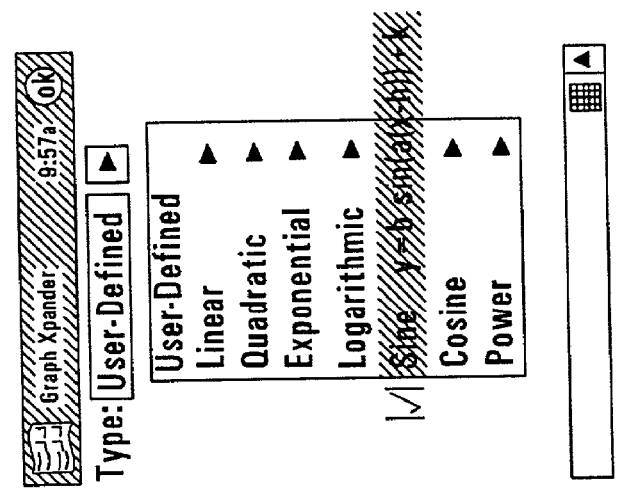
Figure 6:
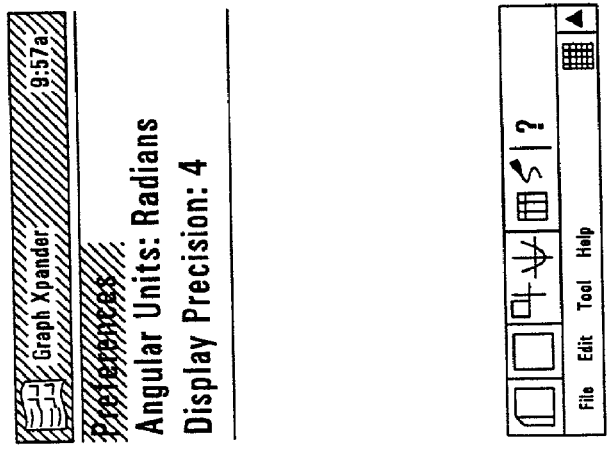

An underlying software architecture that may support the zoom feature of the device 1 and which uses an object-oriented methodology is shown in FIG. 5.

In FIG. 5, the Relation is a software component which stores the formulae representing the mathematical relations which are shown on the screen 2 of the device 1.

The Plotview is a software component which is responsible for the display of the graphical form of the underlying Relation objects and for the processing of the user inputs which use the stylus in the graphing window of the screen 2 (e.g. translation, dilation, tracing and the like). It interacts with the PlotControl component to which it passes user interactions and from which it receives notifications about changes in the Relations.

The PlotControl is a software component which facilitates the exchange of information between the PlotView and the Relation object that the PlotView represents. In the direction of PlotView to Relation, the information represents changes to the Relation (translation, etc.), or requests for recalculations (such as those triggered by a change in the screen boundaries caused by a zoom action). This step involves the PlotEvaluationAlgorithm. In the direction of Relation to Plotview, the information represents the data necessary to display the graph.

The PlotEvaluationAlgorithm is a collection of mathematical rules and procedures used to efficiently produce outputs for a particular relation over the domain of the values on the graphing window. Thus, the procedures may provide for the calculation of only a few of the graphical form points in the domain to be displayed, and may provide an interpolation algorithm for drawing the remainder of the graphical form based on the known mathematical properties of the relation. Each relation of the table of FIG. 2 will for example have its own dedicated algorithm.

When a user initiates a command to zoom in to or out of a graphical form on the screen 2, a "Graph View" component, which controls the screen display first determines the type of zoom (based upon the icon pressed, either 6a or 6b) and the location of the stylus tip. The PlotView then uses the horizontal and vertical zoom factors to recalculate the horizontal and vertical co-ordinates of the screen boundaries. The Graph Settings (i.e. the maximum and minimum co-ordinates for the horizontal and vertical boundaries of the screen) are then updated, and this triggers the calculation of the plots.

For each Relation that appears in the PlotView, the following occurs: The PlotView notifies the PlotControl object for the current relation of the change in the screen boundary values. The PlotControl then uses the PlotEvaluationAlgorithm to recalculate the plot. The PlotEvaluationAlgorithm interrogates the Relation for information needed (such as the parameters of the relation) to recalculate the plot. Once the plot is calculated, the PlotControl sends the new plot to the PlotView for display.

This entire process of determining the zoom center, recalculating the Graph Settings and redrawing all of the graphical forms is repeated continuously while the stylus 4 is held on the screen 2.

Although the above embodiments have dealt with the display of a graphical form of a mathematical object, the invention may also be applied to other images. For example, the displayed image may be a drawing, picture, photograph, diagram or the like, and, could, for example, comprise a map. In such applications, the action of zooming into or out of the image may take the form of determining a new portion of the image to view based on the zoom factor and zoom center and resampling a bitmap of the image stored in the device's memory to provide the new portion of the image on the screen in greater or lesser detail.

Also, instead of using a stylus device, the invention may be applied with any other suitable apparatus. For example, the invention may use a digitising tablet and pen or puck, a light-pen, or some other suitable pointing device, to determine the center of the zoom.

It is to be understood that various alterations additions and/or modifications may be made to the parts previously described without departing from the ambit of the invention.

EXAMPLE

An example of screen displays which might be provided during a zoom into a graph of a standard sine function, $y=b*\sin(a*(x-h))+k$, of the table of FIG. 2 is shown in FIGS. 6 to 12.

Thus, the first display of screen 2 (FIG. 6) is clear to start with. The user then chooses a sine function from the options provided by a dropdown menu in FIG. 7, and edits the symbolic form of the function as desired in FIG. 8 (the user may change any of the parameters a, b, h or k in the standard function). Alternatively, the device 1 may provide the user with the option to input information to define their own function, in which case, the device may include a software component to identify the user-defined function as being one of a pre-defined set of relations as in FIG. 2.

Figure 9:
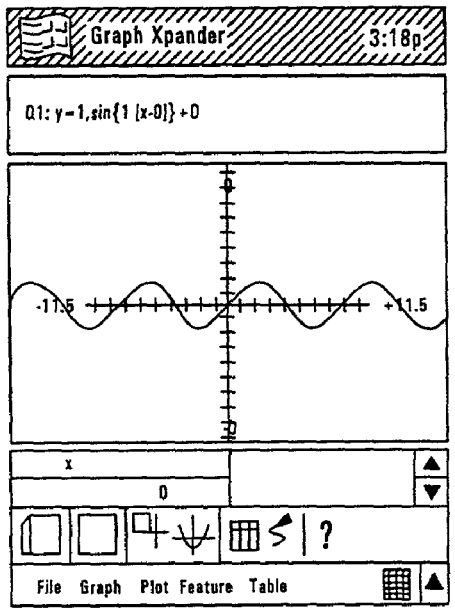
Figure 10:
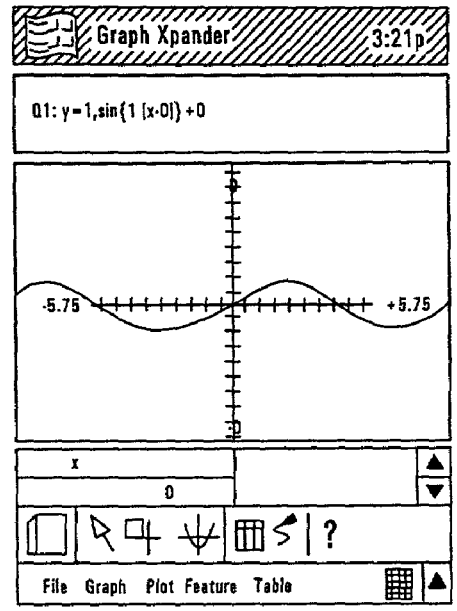
Figure 11:
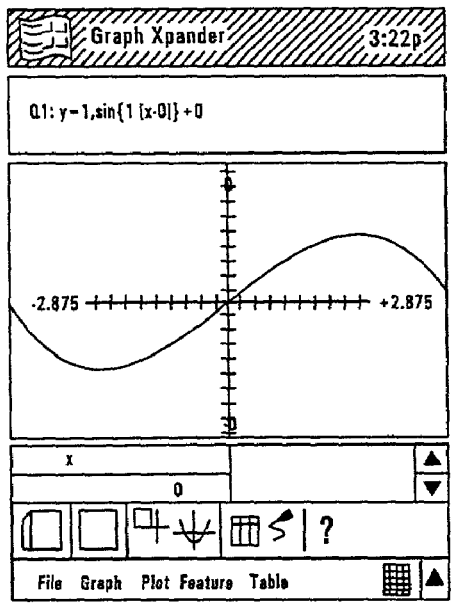

Once this is done, the device 1 presents the symbolic and graphical forms of the mathematical function on the screen 2 as in FIG. 9.

The user can then zoom into the graphical form of the function by choosing the zoom-in tool 6a from the toolbar 5, and by placing and holding the stylus 4 on the screen 2 at the desired center of zoom. In this example the user should be considered to have placed the stylus 4 at the origin of the graphical form, and so the zoom is centered on the origin also. This produces a continuous zoom into the graphical form, with a continuous progression of incremental enlargements (including the instantaneous screen shots of FIGS. 10 and 11) being shown on the screen 2 until the user lifts the stylus 4 from the screen 2 to leave for example the screen display of FIG. 12.

Figure 12:
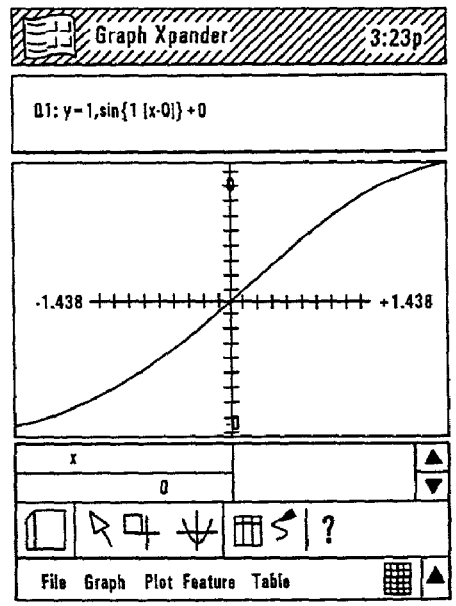

In the case of a zoom out of the graphical form, the user would select the zoom-out icon 6b, place the stylus 4 on the screen 2 at the desired center of the zoom-out, e.g. again at the origin, and the screen display would then continually reduce the image, for example beginning at FIG. 12 and ending at FIG. 9 when the stylus 4 is removed from contact with the screen 2.

The invention claimed is:

1. A system for manipulating an image on a screen, said system comprising:
    a touch-sensitive screen for displaying said image;
    a stylus for indicating an image point of said image displayed on said screen by touching said screen; and
    generating means for generating said image on said screen, said means for generating including a dynamic zoom means for carrying out a zoom action on said image on said screen;
    wherein said zoom means detects the image point indicated by said stylus on said screen while the stylus is moved across said screen, and repeatedly performs a zoom action on said image on said screen using said detected image point as the center of said zoom action until said stylus is removed from said screen to thereby one of continuously enlarge and reduce the image as the stylus is moved across the screen with the center of the zoom action following the movement of the stylus.

2. The system of claim 1, wherein said zoom action comprises an enlargement of said image on said screen about said image point.

3. The system of claim 1, wherein said zoom action comprises a reduction of said image on said screen about said image point.

4. The system of claim 1, wherein said image is the graphical form of a mathematical object wherein a mathematical object comprises at least one of a mathematical function or a mathematical relation having a symbolic formula, and wherein said means for generating includes means for generating said graphical form of said mathematical object.

5. A method of manipulating an image on a touch-sensitive screen using a stylus, said method comprising the steps of:
    displaying said image on said screen;
    detecting an instruction to perform a zoom action on said image;
    detecting a point of contact of said stylus on said screen as said stylus is moved across said screen;
    setting a center of said zoom action at said detected point of contact of said stylus as said stylus is moved across said screen; and
    performing said zoom action on said image on said screen using said set center of zoom; and
    repeating said step of performing said zoom action until it is detected that said stylus has been removed from contact with said screen thereby one of continuously enlarging and reducing the image as the stylus is moved across the screen with the center of the zoom action following the movement of the stylus.

6. The method of claim 5, wherein said zoom action is an enlargement of said image on said screen.

7. The method of claim 5, wherein said zoom action is a reduction of said image on said screen.

8. The method of claim 5, wherein said image is the graphical form of a mathematical object wherein a mathematical object comprises at least one of a mathematical function or a mathematical relation having a symbolic formula, and wherein said step of displaying on image an said screen includes the step of generating said graphical form of said mathematical object.

9. A system for manipulating an image on a screen, said system comprising:
- a touch-sensitive screen for displaying said image;
- a stylus for indicating an image point on said screen by touching said screen; and
- means for generating said image on said screen, said means for generating including a zoom means for carrying out a zoom action on said image on said screen;
- wherein said zoom means detects the image point indicated by said stylus on said screen, and simultaneously and repeatedly performs a zoom action on said image on said screen using said detected image point as the center of said zoom action until said zoom means detects that said stylus has been removed from contact with said screen; said zoom means continually monitors the position of said stylus on said screen; and wherein on movement of said stylus across said screen, said zoom means alters the center of said zoom action so that the center of said zoom action follows the movement of said stylus to thereby one of continuously enlarge and reduce the image as the stylus is moved across the screen with the center of the zoom action following the movement of the stylus.

10. A method of manipulating an image on a touch-sensitive screen using a stylus, said mathod comprising to steps of:
- displaying said image on said screen;
- detecting an instruction to perform a zoom action on said image;
- detecting a point of contact of said stylus on said screen;
- setting a center of said zoom action at said detected point of contact of said stylus on said screen;
- performing said zoom action on said image on said screen using said set center of zoom;
- moving the stylus across said screen while maintaining contact between the stylus and the screen, thereby changing the position of the point of contact on the screen;
- moving said center of said zoom action in accordance with the movement of said stylus across said screen thereby one of continuously enlarging and reducing the image as the stylus is moved across the screen with the center of the zoom action following the movement of the stylus.

* * * * *

UNITED STATES PATENT AND TRADEMARK OFFICE
CERTIFICATE OF CORRECTION

PATENT NO.        : 7,446,783 B2  
APPLICATION NO.   : 09/834255  
DATED             : November 4, 2008  
INVENTOR(S)       : Peter Alexander Grossman Page 1 of 1

It is certified that error appears in the above-identified patent and that said Letters Patent is hereby corrected as shown below:

In column 8, line 14, in Claim 1, delete "generating" before "means".

In column 8, line 65, in Claim 8, delete "on" and insert -- an --, therefor.

In column 8, line 65, in Claim 8, delete "an" and insert -- on --, therefor.

In column 10, line 2, in Claim 10, delete "mathod" and insert -- method --, therefor.

In column 10, line 2, in Claim 10, delete "to" and insert -- the --, therefor.

Signed and Sealed this

Twelfth Day of May, 2009

JOHN DOLL  
*Acting Director of the United States Patent and Trademark Office*